US008165958B1

(12) United States Patent
McLaughlin et al.

(10) Patent No.: US 8,165,958 B1
(45) Date of Patent: Apr. 24, 2012

(54) ELECTRONIC BILL PRESENTATION AND PAYMENT METHOD AND SYSTEM

(75) Inventors: Edward G. McLaughlin, Newtown, PA (US); Flint A. Lane, Princeton Jct., NJ (US)

(73) Assignee: Metavante Corporation, Brown Deer, WI (US)

( * ) Notice: Subject to any disclaimer, the term of this patent is extended or adjusted under 35 U.S.C. 154(b) by 0 days.

(21) Appl. No.: 09/277,189

(22) Filed: Mar. 26, 1999

(51) Int. Cl.
*G06Q 40/00* (2006.01)

(52) U.S. Cl. .............................. 705/40; 705/39

(58) Field of Classification Search ............... 705/10–44
See application file for complete search history.

(56) References Cited

U.S. PATENT DOCUMENTS

| | | | | |
|---|---|---|---|---|
| 5,168,444 A * | 12/1992 | Cukor et al. | | 705/1 |
| 5,383,113 A | 1/1995 | Kight et al. | | 364/401 |
| 5,424,938 A | 6/1995 | Wagner et al. | | 364/408 |
| 5,465,206 A | 11/1995 | Hilt et al. | | 364/406 |
| 5,483,445 A | 1/1996 | Pickering | | 364/406 |
| 5,557,515 A * | 9/1996 | Abbruzzese et al. | | 705/9 |
| 5,655,008 A | 8/1997 | Futch et al. | | 379/91.01 |
| 5,684,965 A | 11/1997 | Pickering | | 395/234 |
| 5,696,906 A | 12/1997 | Peters et al. | | 395/234 |
| 5,699,528 A | 12/1997 | Hogan | | 395/240 |
| 5,706,442 A | 1/1998 | Anderson et al. | | 395/227 |
| 5,710,889 A | 1/1998 | Clark et al. | | 395/244 |
| 5,832,460 A | 11/1998 | Bednar et al. | | 705/27 |
| 5,848,400 A | 12/1998 | Chang | | 705/35 |
| 5,867,153 A | 2/1999 | Grandcolas et al. | | 345/326 |
| 5,873,072 A | 2/1999 | Kight et al. | | 705/40 |
| 5,884,288 A | 3/1999 | Chang et al. | | 705/40 |
| 5,920,847 A | 7/1999 | Kolling et al. | | 705/40 |
| 5,943,656 A | 8/1999 | Crooks et al. | | 705/30 |
| 5,956,700 A | 9/1999 | Landry | | 705/40 |
| 5,963,925 A * | 10/1999 | Kolling et al. | | 705/40 |
| 5,978,780 A * | 11/1999 | Watson | | 705/40 |
| 6,078,907 A * | 6/2000 | Lamm | | 705/40 |
| 6,097,834 A * | 8/2000 | Krouse et al. | | 382/137 |
| 6,381,584 B1 | 4/2002 | Ogram | | |
| 6,385,595 B1 * | 5/2002 | Kolling et al. | | 705/40 |
| 7,028,008 B2 * | 4/2006 | Powar | | 705/40 |
| 2002/0194125 A1 | 12/2002 | Shimada | | |

FOREIGN PATENT DOCUMENTS

| | | |
|---|---|---|
| WO | WO 99/18529 | 4/1999 |
| WO | WO99/42944 | 8/1999 |
| WO | WO00/48085 | 8/2000 |
| WO | WO01/77938 | 10/2001 |

(Continued)

OTHER PUBLICATIONS

Bill Walker, "Preent bills any way the customer wants them", Bank Systems & Technology, New York, Jan. 1999, vol. 36, Issue 1, p. S8, 3pgs.*

(Continued)

*Primary Examiner* — Frantzy Poinvil
(74) *Attorney, Agent, or Firm* — Finnegan, Henderson, Farabow, Garrett & Dunner, LLP

(57) ABSTRACT

A comprehensive electronic bill presentment and payment system and method is described. Bills can be received by the system, in any electronic format. Bills can also be received by the system through conventional paper-based channels. Paper bills are scanned and information is extracted from the scanned bill images using OCR techniques. Bill payments can be issued using either electronic or paper-based methods. A single electronic bill presentment and payment interface is provided which shields the user from evolving billing practices.

23 Claims, 7 Drawing Sheets

FOREIGN PATENT DOCUMENTS

WO      WO 02/14985      2/2002

OTHER PUBLICATIONS

"Washington Water Power Enterprise, Avista Advantage, and NPC Reach Bill Processing Agreement", PR Newswire, New York, Sep. 21, 1998.*

Orr, Bill, "Billers will call the shots in bill presentment", ABA Banking Journal v90n4, pp. 70, Apr. 1998, Dialog file 15, Accession No. 01619378.*

"Group 1 Adds to is Internet Document Delivery Capabilities", Washington Nov. 12, 1998, http://web.archive.org/web/.*

Sharon Osberg, "Wells Fargo: Standards-Based Electronic Bill Presentment and Payment (EBPP)". Nov. 1999, XP-002192923.

* cited by examiner

| | Bill Inbox - These bills are awaiting your payment instructions | | | |
|---|---|---|---|---|
| | Due Date | Biller | Total Due | Min Due |
| | 3/10/1999 | Philadelphia Gas Works | $50.97 | $50.97 |
| | 3/15/1999 | Greater Media Cable | $42.62 | $42.62 |
| | 3/15/1999 | PECO Energy | $135.80 | $135.80 |
| | 3/16/1999 | Chase Automotive Finance | $275.77 | $275.77 |
| | | Totals: | $505.16 | $505.16 |

| | Payment Outbox - These payments have been scheduled | | | |
|---|---|---|---|---|
| | Pay Date | Biller | Chk Num | Pay Amt |
| | 2/26/1999 | Water Revenue Bureau | 7034 | $43.40 |
| | | Totals: | | $43.40 |

Sidebar: Bills, Billers, Reports, Profile, Contact Us, Sign Out

Fig. 5

ELECTRONIC BILL PRESENTATION AND PAYMENT METHOD AND SYSTEM

BACKGROUND OF THE INVENTION

Consumer bill management has traditionally been an expensive process for both consumers and billers. Consumers spend several hours a month reviewing and filing bills, and coordinating payments for utility bills, credit card bills, mortgage payments, car loan payments, insurance payments, etc. The most common method of payment of the bills is writing paper checks for the appropriate amounts and mailing the checks to the billers. Writing individual checks to pay each bill can be time-consuming and costly due to postage and other related expenses.

The current methods of bill presentment and payment are also very inefficient and expensive for the biller. It is a physical and paper intensive process, with the typical biller spending an estimated $0.75 to $1.50 to simply print and mail a consumer's bill.

Every one of the over 100 million households in the United States is in some way involved with the process of receiving, approving and paying bills. The average household receives 12 regularly occurring bills, representing a significant part of the total domestic volume of over 15 billion business-to-consumer bills created annually. The primary method consumers use to pay these bills is a paper bank check, which accounted for approximately three quarters of all non-cash payments in 1997.

Convenience is one of the primary drivers for the adoption of new consumer services today. Consumers find bill paying a time consuming, unpleasant task and there is a high level of consumer dissatisfaction with the entire process. In essence, everyone pays bills, and almost no one likes doing it.

In response to the consumer need to provide greater convenience in the bill payment process, retail banks have provided a form of online banking service that includes a bill payment function. Most of these services do not currently provide a bill presentation feature to the user. Thus, the customer will still receive the bill in the mail then enter payment amounts into the bank's system. This bill payment process is functionally equivalent to the conventional check writing process, the only difference being the elimination of the mailing of the physical check.

Another proposed solution for providing greater convenience in the bill payment process is disclosed in U.S. Pat. No. 5,832,460. U.S. Pat. No. 5,832,460 is directed to a method of electronically creating, presenting, paying and reconciling bills. In this process, the billers send electronic messages to the electronic bill presenter. The bill presenter presents the bills for a customer, and the customer indicates the bills he wishes the bill presenter to pay and the amount of payments through payment authorizations. A message is presented to the customer's bank, which then sends payment to the biller's bank. The biller's bank sends a notification to the biller. The bill presenter also sends a message indicating the reconciled payments to the biller for comparison with the payment notification message received from the biller's bank.

This bill payment process is highly dependent upon the existence of billers that send electronic bills to an electronic bill presenter. The vast majority of billers today are unable to deliver electronic bills, and the methods and industry standards for electronic bill delivery are still evolving. Additionally, some billers who are capable of electronic bill delivery are unwilling to send bills electronically. These billers want ultimate control over the electronic release of their billing information due to privacy considerations (e.g., phone bills). In other cases, billers are unwilling to commit to electronic billing due to the lack of a universal industry standard for the transmission of billing information. The fragmentation within the market dictates that a unified standards approach is unlikely to emerge, thereby limiting the pervasiveness of the electronic transmission of billing information.

SUMMARY OF THE INVENTION

The present invention solves the problems of traditional bill processing by establishing one source for presentment and payment of all of a consumer's bills. To provide this comprehensive bill presentment and payment service, the system of the present invention receives bills both electronically and through the postal service. Electronic billing information can be received in any format from any biller. Accordingly, the system is not dependent upon the evolution of competing electronic bill transmission standards. Bills received through the postal service are scanned and summary billing information is extracted through use of Optical Character Recognition (OCR) techniques. The extracted summary data is stored in a summary billing information database that also stores the summary data that was received electronically. The scanned images are stored in an images database.

In operation, the system of the present invention provides a user interface that enables the presentation of all electronic or paper bills that are received on behalf of the user. All bills are presented within an inbox without distinguishing the origin of the various bills. In this manner, changes within the billing practice of particular billers (e.g. changing from paper bills to electronic bills) are shielded from the user. The user's perception does not change as the system of the present invention continues to operate as a single interface into the billing world that contains ever changing billing practice. The user can also see detailed information about any bill. If the bill was received through electronic means, then the system will display all relevant information that is received. If the bill was received through the postal service, a scanned image of the actual bill is presented. A single comprehensive presentation system is thereby achieved.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 5 illustrates a user interface for the electronic presentation and payment process.

DETAILED DESCRIPTION

Figure 1:
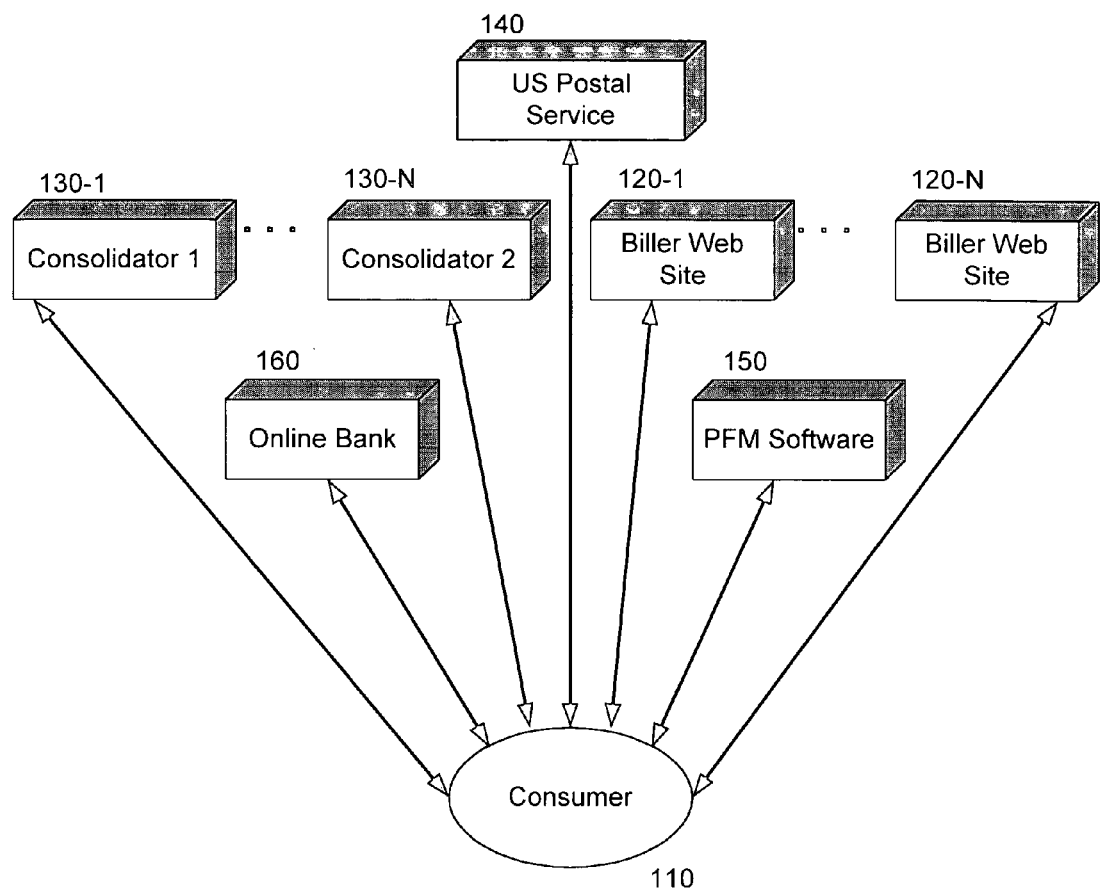
FIG. 1 illustrates a conventional bill presentation and payment process.

Reference will now be made in detail to the preferred embodiments of the present invention, examples of which are illustrated in the accompanying drawings.

The costs and inefficiencies of paper-based billing and payment have long been recognized. Many attempts have been made over the years to reduce or eliminate the cost of billing and payment processing, including pay-by-phone, automatic credit card payment and automatic direct payment. These initiatives have met with varying, but usually limited, degrees of consumer acceptance, due to their individual costs and technical limitations.

The Internet is recognized as having the potential to play a key role in the development and proliferation of bill management systems. Currently, over 27% of US households have Internet access, either through direct connections with an Internet service provider, or through a proprietary subscription service such as America Online. The percentage of households with Internet access continues to grow at a phenomenal rate, and is expected to reach 56% by 2002.

The frequency and duration of connections by these users is also increasing, as new services become available and consumers increase the type of activities they perform online. Having made the investment to get online, consumers are looking to leverage this connection for activities beyond searching, "surfing", and chatting. Email is nearly universal, used by 94% of the online population. This provides a ready-made and familiar channel for communication with this community.

Internet access from the home is providing a new mechanism to deliver consumer services in a highly interactive and cost effective manner, with the potential to fundamentally change how basic services are delivered. Online consumer purchases, home banking, stock trades and auctions have all seen dramatic growth over the last 18 months as consumers become more comfortable using the Internet for commercial activities. The 1998 holiday season is powerful evidence of a breakthrough for online commerce, with a new wave of consumers embracing online transactions.

The rising level of household Internet connectivity and regular usage provides the potential 'critical mass' of consumers required to successfully deliver new types of mass market services. The explosive growth of new service providers, such as the Internet auction house eBay—which added over 1 million new users in the last year—highlight how rapidly innovative services are adopted by the Internet community.

The explosive growth of the Internet has created the perfect mechanism to automate information intensive services which have broad consumer impact. Electronic bill presentation and payment (EBPP) is at the nexus of two powerful market drivers—convenience-driven consumers who are unsatisfied with the current methods of bill payment, and billers who are desperate to automate this expensive process. Virtually every organization involved with billing or consumer finances is interested in this market. Tremendous expansion is expected over the next few years.

Automation of the paper-based billing and check payment systems has long been an elusive goal for the industry. The emergence of the Internet has spurred a great deal of activity over the last two years, with large billers, billing service providers, software vendors, financial institutions and service companies all attempting to leverage the EBPP opportunity. Within this expansive and rapidly changing environment, the introduction of new EBPP services is inevitably fragmented.

Various approaches of delivering EBPP can be utilized. Two basic approaches are envisioned. One approach is the direct bill presentation model. The direct model envisions billers delivering their billing information to the consumer from their own internal Web site, or a dedicated site managed by a billing service provider. This model would appeal to billers who are experimenting with the Internet as an extension of their customer care systems and who are attempting to maintain the dominant position in the interaction with their customers.

The major disadvantage of the biller direct model is it is based on a fundamentally flawed assumption. It assumes that the consumer will put up with the hassle and aggravation of visiting over a dozen different web sites, with different user-ids, passwords, notification methods, payment methods and user interfaces—simply to pay their bills. It has been estimated that a consumer will put up with no more than two different sites to find and pay their bills. It will be extremely difficult for a biller-centric approach to be enticing to consumers, unless they are offered a financial incentive that would far outweigh the cost savings realized by the move to electronic billing in the first place.

Another approach is the electronic bill consolidator model. In the consolidator model, a third-party processor collects billing information from a number of billers for presentation to the consumer. In one possible implementation, all of the billing information could be sent to the consolidator, while in a second possible implementation, only summary information is sent to the consolidator for presentation, and the consumer would link back to the biller's system to view details of the bill.

These consolidator models give an indication of the levels of confusion and contention that lead to the fragmented evolution of the market. For example, some billers want ultimate control over the electronic release of their billing information due to privacy considerations (e.g. phone bills). Their policies could ultimately shape a significant segment of the market. In another example, some billers are looking to outsource the billing process entirely. For them cost, not control, is the primary concern.

A consolidator's success will depend upon its success in attracting billers into its network. The different strengths, relationships and consolidation philosophies of the consolidator organizations will likely guarantee that billers who choose to use a third-party consolidator will be split across multiple consolidator networks. Competition between the various consolidators will contribute greatly to the fragmentation in the market and will ultimately prevent the emergence of a single dominant consolidator. Thus, while these consolidators represent powerful forces in the market, their reach will be limited to the billers and financial institutions that they can bring into their networks.

All of the variants of the consolidator model are dependent on exchanging complex billing and enrollment information between billers and various third parties electronically. In order for the consolidator model to work, a universal industry standard for bill information management must be developed and accepted. As one can readily appreciate, the standards process is a slow moving and bureaucratic process.

Any entity that has a product strategy that is entirely dependent on the emergence of an electronic standard is at the mercy of the market adoption rate. Evolutional risks are also a concern. It is important to note that billing information, particularly the detail, is inherently complex and varies greatly from industry to industry, and vendor to vendor. Experience thus far has proven that it is not a simple process for multiple parties to manage and transmit billing information, even if it is presented in a "standards" based format. The inability of a unified standards approach emerging will likely limit the pervasiveness and hence the effectiveness of the consolidators.

The presentation and payment of bills requires the combination of capabilities currently performed by a number of different types of organizations, and there is no natural provider of a unified service in today's market. Billers can only present their own billing content, banks can only provide payment services for their own customers, and consolidators are dependent on the billers that choose to join their network.

Despite all of the industry efforts and alliances to date, widespread consumer adoption of EBPP will not be achieved until consumers can access and pay a significant number of their bills from a single location. Consumers have proven extremely resistant to having to manage multiple Web locations, user interfaces and security systems simply to pay their bills.

The fragmentation within the bill management industry will likely continue for the foreseeable future as the industry rapidly evolves. This fragmentation will ultimately limit the rate of adoption of EBPP by consumers, who are looking for a truly convenient system. Significantly, conventional bill management systems cannot manage all of a consumer's bills. Consumers will still receive at least some of their bills through the mail. Accordingly, consumers will still have to write checks and mail remittances for at least some of their bills.

As shown in FIG. 1, a consumer 110 who wishes to see and pay bills electronically may have to communicate with a number of different sources to see and pay all of his bills. Some billers may have their own Web site 120-1 to 120-N through which they present bills to their customers and receive payment. However, they are only capable of presenting bills and receiving payments on their own accounts. Other billers may have agreements with an electronic bill consolidator 130-1 to 130-N to which they electronically send customer billing information. Consolidators 130-1 to 130-N gather these bills and present them to the consumer on that consolidator's Web site. Consolidators 130-1 to 130-N may also have the ability to receive payment from consumers, but only for those bills that they present to the consumers. For those billers that do not support some form of electronic billing, the only avenues for bill presentation and payment is through the U.S. Postal Service 140.

Personal Finance Management (PFM) software 150, such as Microsoft Money and Intuit Quicken, is capable of making bill payments to any biller. Most PFM software currently does not support on-line bill presentation. PFM software that does provide bill presentation does so on a limited basis. For instance, Quicken is currently limited to presenting bills for only seven billers. In general, a consumer may only use the software as an "electronic checkbook" to provide payment through the consumer's bank.

Additionally, many banks 160 provide online banking services including bill payment. Like PFM software, most of these online banking services do not provide bill presentation. Banks can provide limited bill presentation features through partnership channels such as Checkfree. For both PFM software and online banking services, typically the consumer still receives bills in the mail and enters payment into the PFM software or online banking system—the same activities as writing a check, simply eliminating the mailing of the physical check.

An additional problem faced by PFM software and online banking users is the potential delay in the posting of a bill payment. Most billers rely on payment remittance stubs that are included in the paper bill to be returned with the remittance to ensure proper payment to that customer's account. These systems simply send a check for the customer, with no remittance stub. Therefore, the biller has to manually determine which account to credit payment. This is costly for the biller, and usually results in a delay in receiving the funds. Additionally, the customer may also be hurt if the delay in posting a payment results in a late fee.

Both online banking and PFM software providers face the same issues for implementing electronic bill presentation. They are basing their future bill presentation strategies on receiving all billing information electronically from one or more third-parties. As noted, the success of this strategy depends on the eventual industry evolution of standards-based formats. Given the nature of shrink-wrap commercial software, the emergence of a standard universal delivery format is most likely the only option for successfully receiving billing information into their packages. Until all billers are capable of, and desire to, deliver billing information in an industry standard format, online banking and PFM software will remain incapable of providing a bill presentation and payment system for all of a consumer's bills.

Therefore, a need exists for a comprehensive bill payment system to be available to any consumer, regardless of where the consumer banks and regardless of what bills are to be paid. This comprehensive system must be able is to present and make payment for all of a consumer's bills. A less than comprehensive system will likely suffer the unfortunate fate of an inevitably outmoded piece of a continuously evolving fragmented system.

Figure 2:
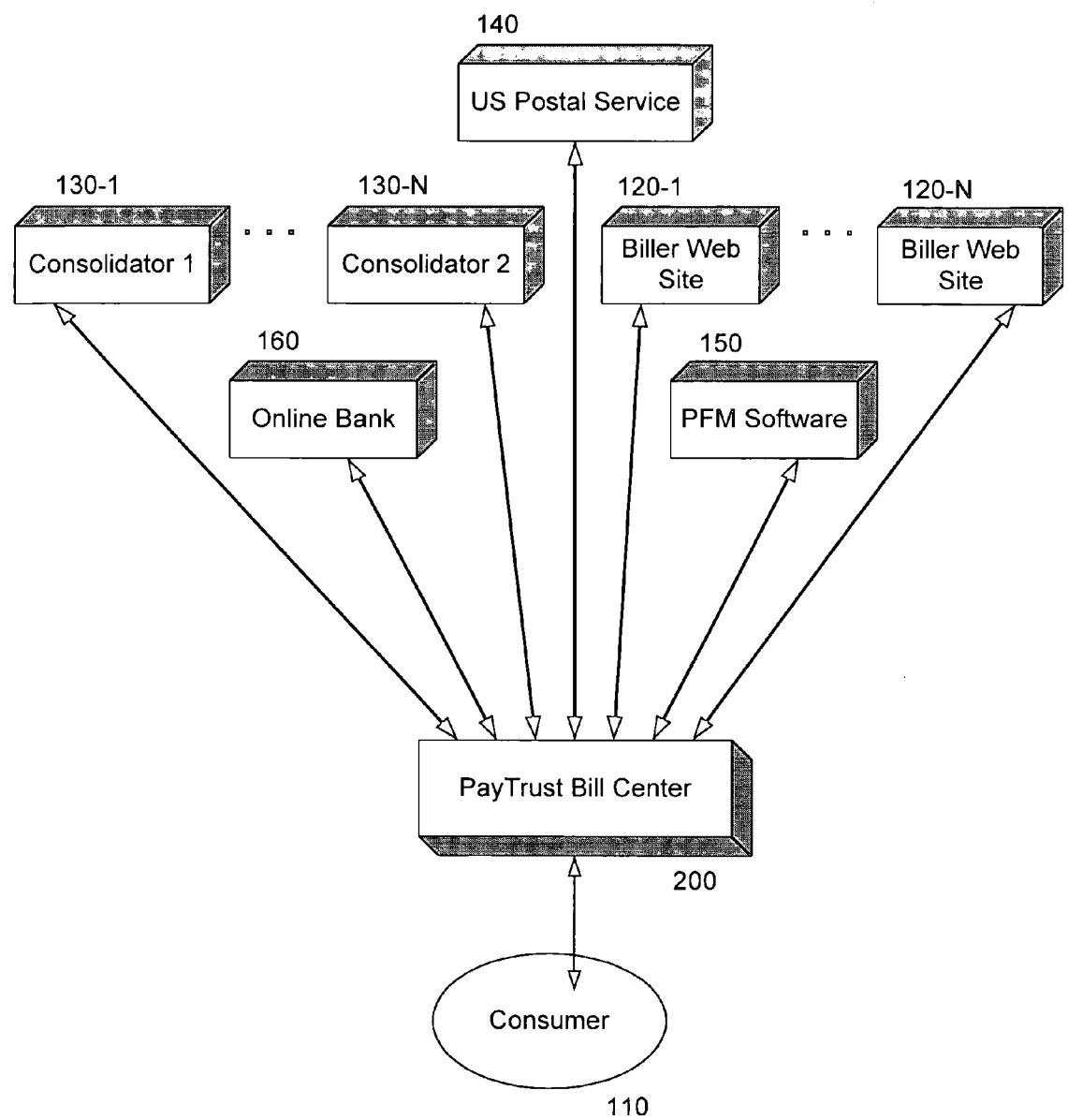
FIG. 2 illustrates a bill presentation and payment process according to the present invention.

The system of the present invention solves this patchwork system of electronic billers 120-1 to 120-N, traditional billers, PFM 150, electronic banking services 160 and electronic bill consolidators 130-1 to 130-N by introducing a true EBPP system 200 that interacts with all of these sources, as shown in FIG. 2. The Paytrust Bill Center 200 acts as the sole source of electronically presenting the consumer's bills, and the sole source for bill payment for the consumer. Consumers who subscribe to the service will receive all of their bills in a single "in box", without regard to how they were processed or delivered.

The establishment of a single system for EBPP addresses a significant market need. The present invention is not dependent upon the current state of evolution within the bill management market. In particular, the present invention is not dependent on the progress within the standards process, the level of acceptance of the various competing consolidator models or the attitudes of individual billers. The EBPP system of the present invention is designed to flexibly interoperate with an industry that will remain fragmented for years to come. It is a feature of the present invention that the consumer will be shielded from the evolution of the bill management process. From the consumer's perspective, EBPP will be addressed consistently via one source.

Figure 3:
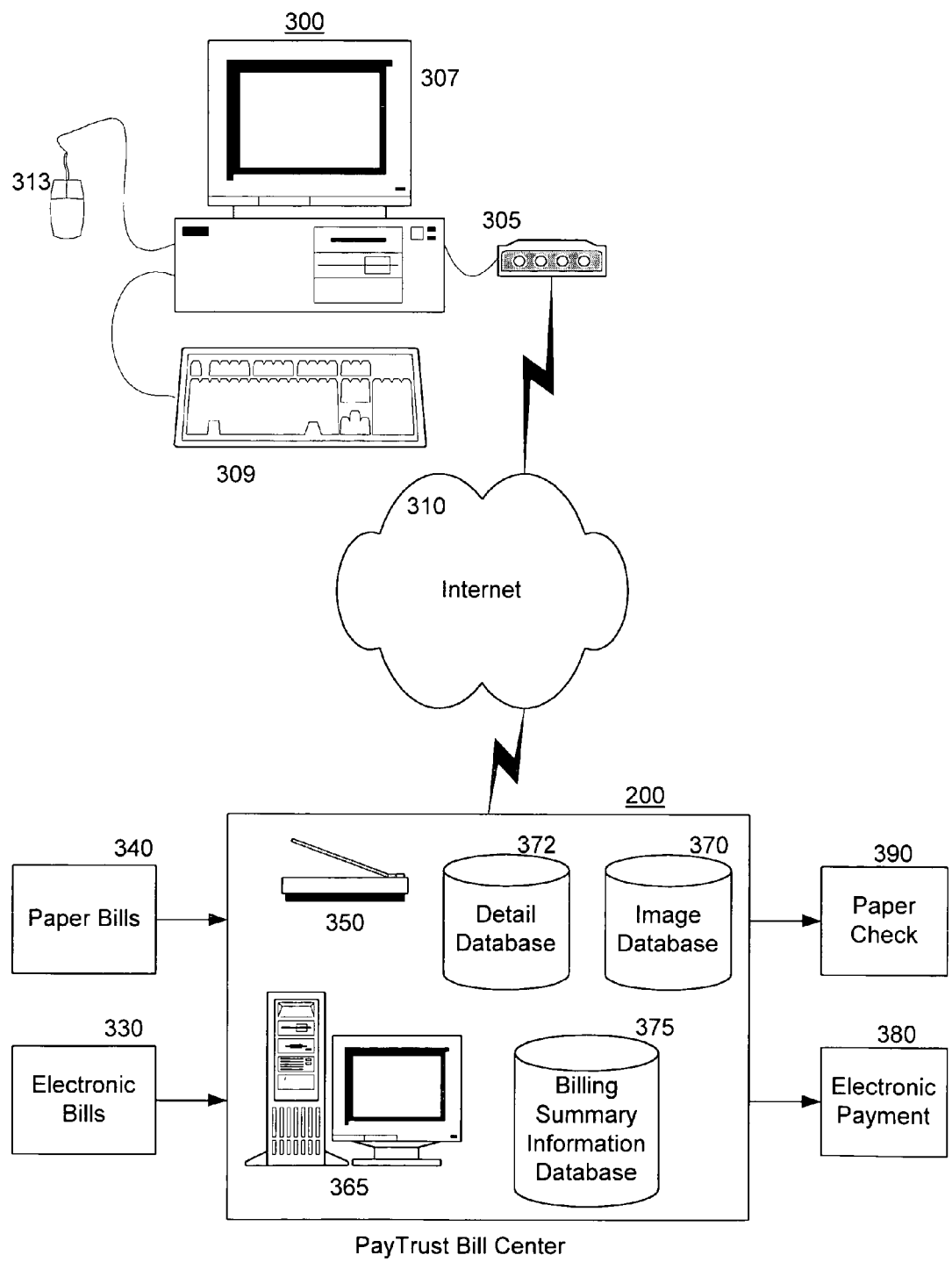
FIG. 3 illustrates the processing components used in the Electronic Bill Presentation and Payment system of the present invention.

The processing components used in the EBPP system of the present invention are shown in FIG. 3. Personal Computer (PC) 300 is used by a consumer who subscribes to the system to access a communications network, such as the Internet, 310. PC 300 can be a convention personal computer that includes a microprocessor (not shown); memory (not shown) for storing data and standard online service software that includes a Web browser, such as America Online; modem 305 for establishing a communications link to the network; display 307; keyboard 309 and mouse 313. PC 300 connects to network 310 through use of the online service software.

The Paytrust Bill Center 200 is also connected to network 310. In one embodiment, Paytrust Bill Center 200 includes one or more server computers 365, scanner 350, image database 370, bill detail database 372 and billing summary information database 375. Server computer 365 contains network communications software for interfacing with consumer PC 300 over the network 310.

Bill Center 200 is the single source for receiving and paying the subscriber consumer's bills. As shown in FIG. 3, Bill Center 200 can receive both electronic bills 330 and paper bills 340.

Electronic bills 330 can be received on magnetic tapes or optical disks that are sent to Bill Center 200, or can be received through a download over a private communications network. Electronic bills can also be received over public communication network 310. The Paytrust system does not depend on any particular format, and will accept electronic billing information from a third-party in any of the various competing standards, such as OFX, IFX or EDI, or even a biller-specific proprietary format. Unlike bill consolidators 130-1 to 130-N who require billers to conform to their standard, the Paytrust system is not tied to the development or acceptance of a particular standard.

As noted previously, billers vary greatly as to how much information they will send electronically. Some billers will only send the basic summary information. Others will send extensive detailed information that may include very complex data. However, all billers will send at least the same basic summary information that is common to all bills. This data can include bill receipt date, bill due date, total amount due, minimum amount due, account number and the consumer's name and address. Once electronic bills are received at Bill Center 200, this standard summary data is extracted and stored in Billing Summary Information database 375. This database contains summary information that is common to all bills, whether electronic or paper-based. Any electronic billing data received that is not included in the Billing Summary Information database 375 is stored in the Bill Detail database 372.

Bill Center 200 also receives paper bills 340 from billers. The ability to seamlessly receive paper bills into the system is a critical feature, as the substantial majority of bills will continue to be paper for the foreseeable future. Many billers are not yet capable of sending bills in electronic format, or they may not be capable of receiving electronic payments. Other billers who have the capability choose not to do electronic billing, so that they retain control over their is billing information and process (e.g. privacy reasons). The conventional solution that requires electronic billing information in a standard format attempts to eliminate the current paper-based billing process that most billers currently use. Unlike these systems, the present invention does not attempt to eliminate the current paper-based billing process, but rather seeks to incorporate the current paper-based billing process into its system. Moreover, unlike other bill consolidating systems, billers need do nothing to participate in the present system. Thus, the present comprehensive system provides seamless integration of the current paper-based billing process into the EBPP process.

When the consumer subscribes to the Paytrust system, paper-based billers are notified that a subscriber's bills are to be mailed to the Paytrust Bill Center 200. It is a feature of the present invention that the subscribing consumer never has to deal with receiving, opening and filing any paper bills. Whether a particular biller is capable of or chooses to implement electronic billing makes no difference to the consumer. The consumer need not be aware of whether Paytrust receives their bills electronically or through the mail. If a biller decides to start billing electronically in the future, the consumer need do nothing. The Paytrust Bill Center will work with the biller to switch from paper billing to electronic billing.

Figure 4:
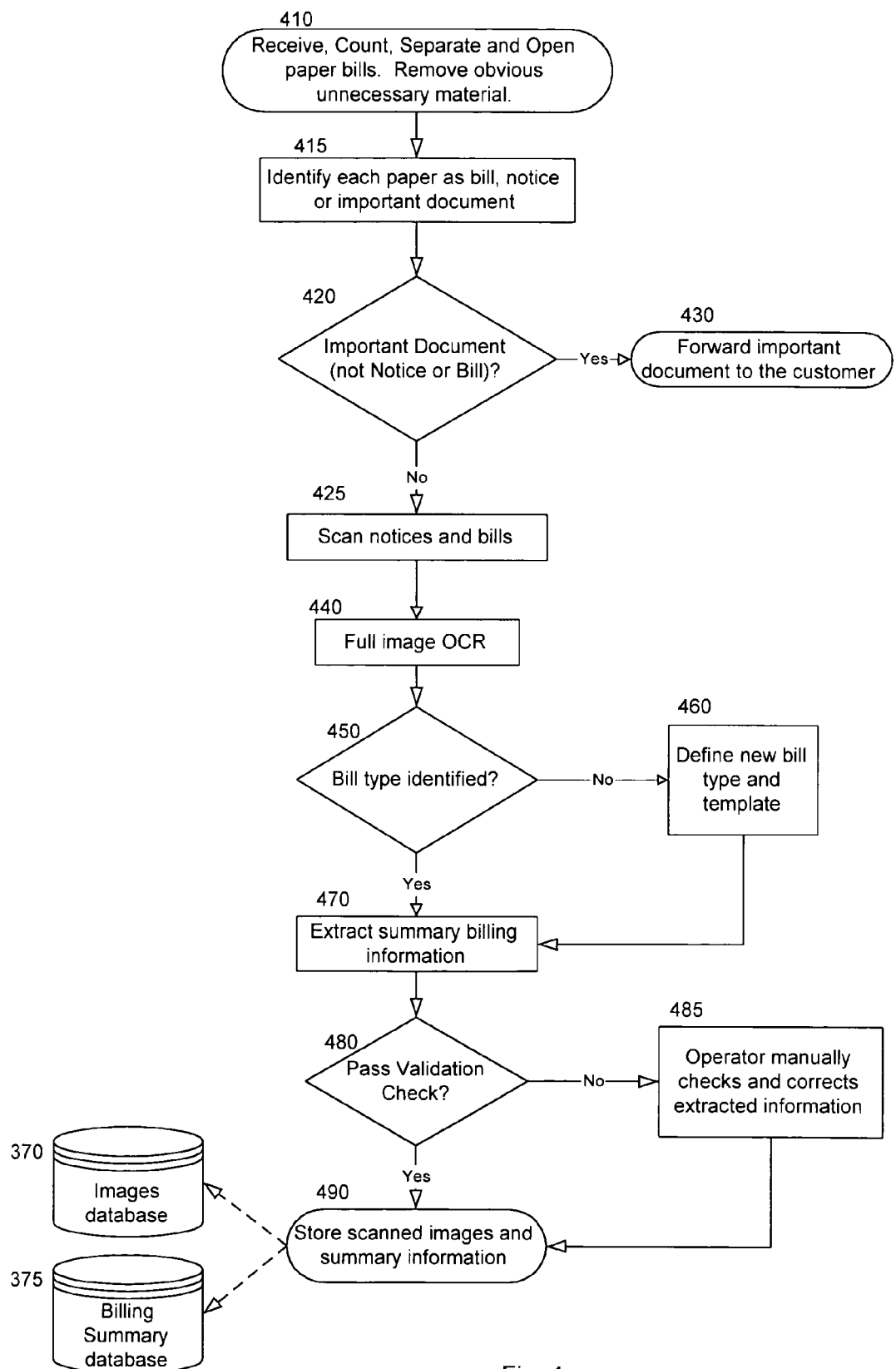
FIG. 4 is a flowchart detailing the paper bill processing used in the present invention.

The operation of receiving and processing paper bills is shown in the flowchart of FIG. 4. When paper bills 340 are received at Bill Center 200, they are counted and separated, at step 410. This may be done either by a Paytrust employee or through the use of an envelope jogger. Obvious unnecessary material is removed, and the remaining contents of the bill envelope are identified as a bill, a notice or an important document at step 415. Bills and notices are scanned at step 425 and important documents are forwarded to the customer at step 430.

Billing information is then extracted from the scanned images using a two-step OCR process. First, the type of bill is identified during a first pass. Then, using a predefined template for the type of bill identified, the billing information is extracted. Using software to identify the bill type is important, because conventional OCR paper handling processes involve an extremely expensive and time consuming 'prep' stage, with documents identified and sorted by hand before scanning. The two-step OCR process of the present invention avoids this manual processing, thereby allowing Paytrust to efficiently handle a wide range of documents.

In the first step, the type of bill is identified. Every type of bill should have a list of numeric identifiers that uniquely identify it. These can include bill payment ZIP Codes, PO Box Numbers, contact Phone Numbers or even form numbers that are sometimes listed on the bottom corner of bills. At step 440, a full image OCR which treats all information as one big zone with a default conversion of numeric is performed on the first page of a bill. The converted information from the full image OCR is searched for these numeric identifiers, and if enough are found, then the type of bill can be identified at step 450.

Every type of bill has an associated template file that contains zone information for locating the required billing summary data and payment remittance stub on the paper bill. This template file may be constructed manually through any text editor program or through use of a graphical template constructor tool. One example of a graphical template constructor is PRVIEW by Prime Recognition. The required billing summary data zones include bill date, bill amount, minimum due, due date, account number and consumer name and address. Once the type of bill is identified, then another OCR of the bill image is performed using this template to extract the billing summary information at step 470. An image of the payment remittance stub is also extracted from the scanned bill image(s) so that it can be stored as a separate image.

If the bill is from a biller that is new to the system, then an operator is called upon to determine identifying characteristics about the bill and determine where on the bill the required summary information and remittance stub are located at step 460. This information is saved in a new template, so that the next time any bill is received from that particular biller, the system will be able to automatically identify the type of bill and extract summary information.

The system also performs validation at step 480 to ensure that amounts and due dates seem reasonable. Any bills that fail the validation check are flagged and an operator is called upon to manually verify correctness at step 485.

The scanned images are stored in the Images Database 370. Preferably, one image is stored for every page of the bill along with a separate image for the payment remittance stub. Once the billing summary information is extracted from the scanned bills, it is stored in Billing Summary Information database 375. Therefore, the Billing Summary Information Database 375 contains summary information for all bills, whether the bills were sent electronically to Paytrust or mailed to Paytrust in the form of paper bills. Once the information is stored in the Billing Summary Information Database 375, it is transparent as to how the information was originally received—by paper or electronically.

Bill Center 200 can make payment on all of the consumer's bills. As shown in FIG. 3, these payments may be in the form of an electronic payment 380. Preferably, electronic payments are made using the Automated Clearing House (ACH) network, but any financial network can be used. Other examples of financial networks include the Automated Teller Machine (ATM) network and the Visa or MasterCard network.

Payments can also be made in the form of a paper check 390 drafted by the system. If the system cuts a paper check, it will also print the image of the biller's payment remittance stub to send along with the paper check to the biller. Delivering the printed remittance stub makes the biller's acceptance of the payment much more efficient, saving the biller significant costs in exception processing. The consumer will have a dramatically reduced risk of late fees from the biller due to potential processing delays in posting payment to the customer's account. Preferably, the payment remittance stub is printed on the same piece of paper as the paper check, reducing processing fees even further.

Basically, the type of payment made by the system depends on the biller. It is completely transparent to the user which type of payment is made.

As noted, a key feature of the present invention is the provision of a single, comprehensive EBPP system. Consumers are not required to interact with multiple Websites in combination with traditional paper-based billing channels. Rather, all EBPP functions are incorporated into a single Website that can accommodate all of a consumer's bills regardless of origin and delivery methodology.

The consumer communicates with the comprehensive Paytrust Bill Center 200 by using standard online software to access the Paytrust Web site. Once the user logs into the system, he is presented a "bill inbox" and a "payment outbox", as shown in FIG. 5.

The inbox shows the bills for that user that have been received by Paytrust, but have not yet been paid. Through the comprehensive design of the Paytrust Bill Center 200, the inbox is designed to contain all bills received by Paytrust, whether they were received electronically or through the mail. The inbox provides seamless integration of bill presentment to the user—the user cannot tell and does not care how the bills were received by Paytrust. If a biller switches from paper to electronic billing, it will not affect the user's perception. Either way, the user sees all unpaid bills in one inbox.

Figure 6:
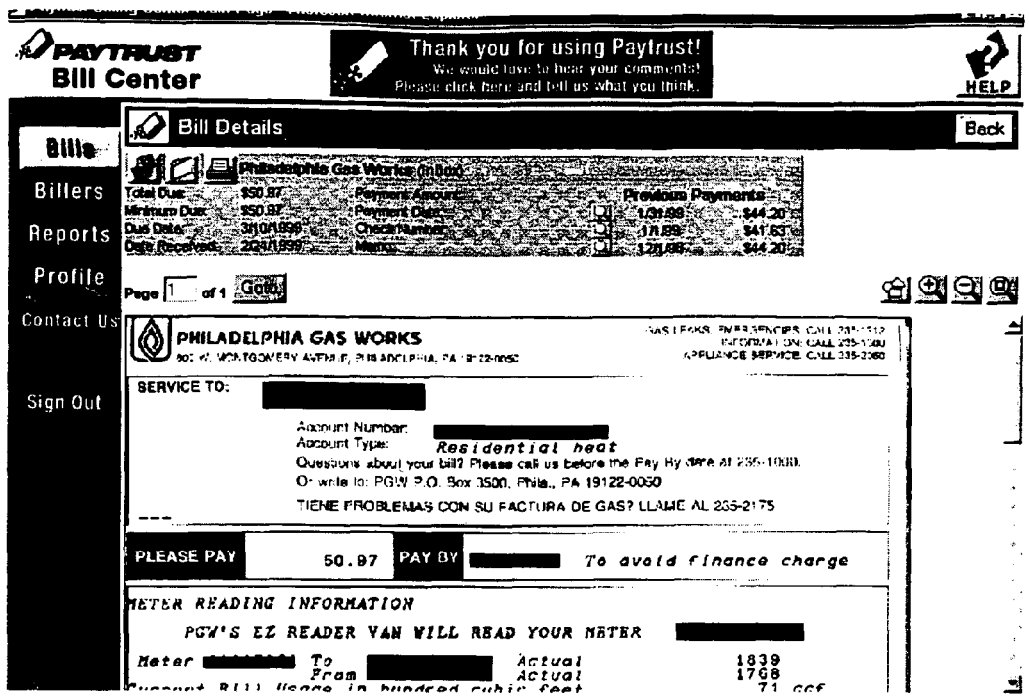
FIG. 6 illustrates a user interface for displaying detailed information of a paper bill.

The user can then display more detailed information about any bill by clicking on the magnifying glass button. This will cause the system to display more detailed information about the bill. FIG. 6 is an example of a bill that is shown to the consumer. The detailed bill in FIG. 6 is actually the paper bill that was scanned by the Paytrust Bill Center. If the bill were received electronically, then a form showing detailed information would be shown to the user. The summary information (due date, amount due, account number, etc.) shown at the top of FIG. 6 is the identical whether the bill were received electronically or through the mail. If the bill was received electronically, the summary information is extracted from the electronic communications. If the bill was received through the mail, the summary information is extracted using the scanning and OCR process described above.

Figure 7:
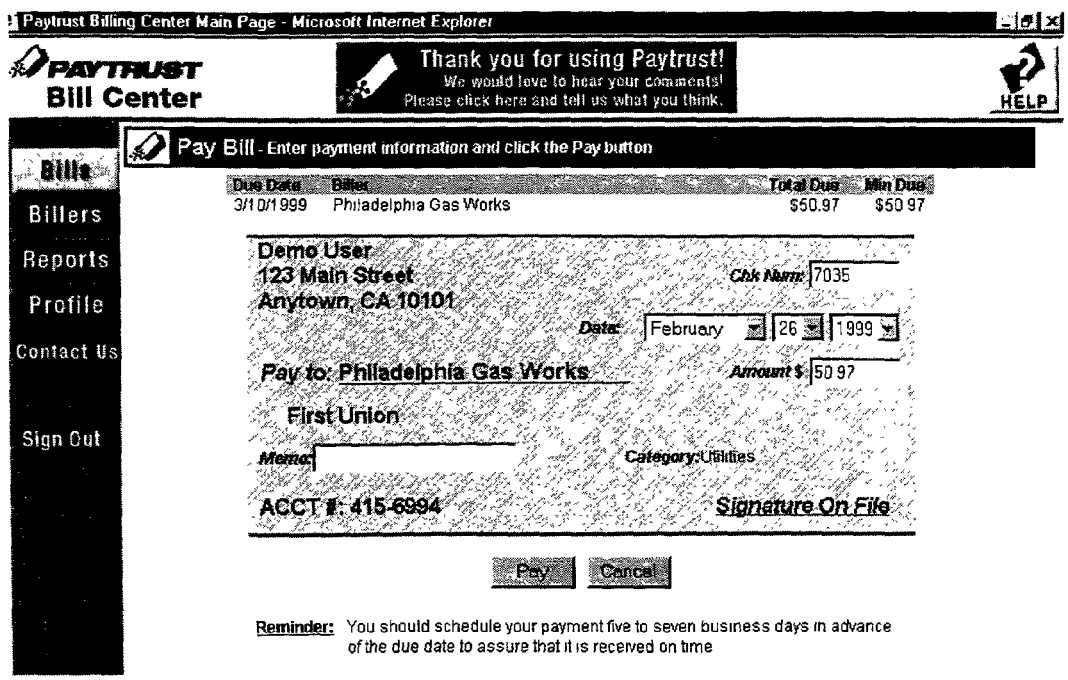
FIG. 7 illustrates a user interface for paying a bill electronically.

The user can choose to pay a bill by clicking on the "$" button. This will cause the system to display a screen like the one shown in FIG. 7. In this screen, the user fills out the "check" for payment. Once the user approves the check, then the bill is moved to the outbox. The outbox shows all bills that have been paid by the Paytrust system.

The Paytrust system is capable of paying all of a consumer's bills, whether payments can be made electronically on not. Depending on the biller, the system either makes an electronic payment, or it drafts a paper check and mails it to the biller along with the remittance stub. Therefore, the biller will receive remittances just as if the consumer had made the payment.

While the invention has been described in detail and with reference to specific embodiments thereof, it will be apparent to one skilled in the art that various changes and modifications can be made therein without departing from the spirit and scope thereof. It is intended that the present invention cover the modifications and variations of this invention provided they come within the scope of the appended claims and their equivalents.

We claim:

1. A method of electronically presenting bills for a customer, comprising:
   subscribing the customer to a bill presentment system for receiving electronic bills and paper bills for the customer;
   notifying a plurality of billers that the customer has subscribed to the bill presentment system, the billers including electronic-based billers and paper-based billers;
   receiving, at a location, an electronic bill and a paper bill for the customer from one of the billers;
   scanning the paper bill received for the customer to generate electronic image information;
   extracting first optical character recognition (OCR) data from the electronic image information by treating the electronic image information as a single zone;
   searching the first OCR data for at least one numeric identifier of a type of the scanned paper bill;
   identifying the type of the scanned paper bill by comparing the at least one numeric identifier to a list of types stored in a memory;
   extracting second OCR data from the electronic image information using a template corresponding to the identified bill type, wherein the template includes zone information for locating portions of the billing information;
   extracting billing information from the second OCR data;
   comparing the extracted billing information with known information;
   based on the comparison, combining the electronic bill and the extracted billing information into a customer bill presentation; and
   presenting the customer bill presentation to the customer.

2. The method of claim 1, further comprising the steps of:
   removing material other than billing information from the received paper bill;
   forwarding documents from the received paper bill to the customer;
   receiving a payment instruction from the customer; and
   sending payment according to the payment instruction.

3. The method of claim 2, wherein the sending comprises printing a physical check drawing funds from an account of the customer.

4. The method of claim 3, further comprising printing a stored scanned image of a remittance stub.

5. The method of claim 2, wherein the sending comprises of submitting an electronic payment.

6. The method of claim 5, wherein the sending comprises submitting an electronic payment using one of an automated clearing house network, an automated teller machine network, or a credit card network.

7. The method of claim 1, wherein scanning further comprises:
   extracting billing information from the electronic image information using optical character recognition and the predefined template; and
   extracting an image of a payment remittance stub from the paper bill.

8. The method of claim 1, further comprising presenting an electronic image of a paper bill upon receipt of a request from the customer.

9. A method of electronically presenting and paying paper bills for a customer, comprising:
   receiving and processing a paper bill in a location for the customer;

identifying the contents of the received paper bill;

scanning the received paper bill to generate electronic image information;

extracting first optical character recognition (OCR) data from the electronic image information by treating the electronic image information as a single zone;

searching the first OCR data for at least one numeric identifier of a type of the scanned paper bill;

identifying the type of the scanned paper bill by comparing the at least one numeric identifier to a list of types stored in a memory;

extracting second OCR data from the electronic image information using a template corresponding to the identified bill type, wherein the template includes zone information for locating portions of the billing information;

extracting billing information from the second OCR data;

validating the extracted billing information;

extracting an image of a payment remittance stub from the paper bill; and presenting the extracted billing information to the customer.

10. The method of claim 9, wherein the type of bill is identified using numeric identifiers within the paper bill.

11. The method of claim 9, further comprising:

printing a physical check drawing funds from an account of the customer.

12. The method of claim 11, further comprising printing a stored scanned image of a remittance stub.

13. A method of electronically presenting and paying paper bills for a customer, comprising:

receiving a paper bill at a location for the customer;

identifying the contents of the paper bill;

scanning the received paper bill to generate electronic image information;

extracting first optical character recognition (OCR) data from the electronic image information by treating the electronic image information as a single zone;

searching the first OCR data for at least one numeric identifier of a type of the scanned paper bill;

identifying the type of the scanned paper bill by comparing the at least one numeric identifier to a list of types stored in a memory;

extracting second OCR data from the electronic image information using a template corresponding to the identified bill type, wherein the template includes zone information for locating portions of the billing information;

extracting billing information from the second OCR data;

validating the extracted billing information;

extracting an image of a payment remittance stub from the paper bill;

storing the extracted image of the payment remittance stub;

presenting the extracted billing information to the customer;

receiving a payment instruction from the customer;

printing a paper check drawing funds from an account of the customer in response to the received payment instruction; and printing the stored scanned image of the remittance stub for the paper bill.

14. The method of claim 13, comprising automatically extracting the billing information.

15. The method of claim 14, wherein the extracting billing information comprises:

extracting billing information from zones that are predefined for the type of paper bill.

16. A system for electronically presenting and paying bills for a customer comprising:

a computer; and a storage medium containing instructions which, when executed by the computer, perform a method comprising:

subscribing a customer to a bill presentment system for receiving electronic bills and paper bills for the customer;

notifying a plurality of billers that the customer has subscribed to the bill presentment system, the billers including electronic-based billers and paper-based billers;

receiving an electronic bill for the customer;

receiving a paper bill for the customer;

scanning the received paper bill to generate electronic image information;

extracting first optical character recognition (OCR) data from the electronic image information by treating the electronic image information as a single zone;

searching the first OCR data for at least one numeric identifier of a type of the scanned paper bill;

identifying the type of the scanned paper bill by comparing the at least one numeric identifier to a list of types stored in a memory;

extracting second OCR data from the electronic image information using a template corresponding to the identified bill type, wherein the template includes zone information for locating portions of the billing information;

extracting billing information from the second OCR data;

validating the extracted billing information; and transmitting to the customer information representing the electronic bill and the extracted billing information.

17. The system of claim 16, wherein the method further comprises:

receiving a payment instruction from the customer to pay a bill;

drafting a payment drawing funds from an account of the customer; and sending the payment to a biller that originated the bill.

18. The system of claim 17, wherein the method further comprises printing a physical check drawing funds from the account.

19. The system of claim 18, wherein the method further comprises printing a stored scanned image of a remittance stub.

20. The system of claim 17, wherein the drafting comprises submitting an electronic payment.

21. The system of claim 20, wherein the submitting comprises submitting an electronic payment using at least one of an automated clearing house network, a automated teller machine network, or a credit card network.

22. The system of claim 16, wherein the method further comprises extracting billing information from the electronic image information using optical character recognition.

23. The system of claim 16, wherein the method further comprises transmitting an electronic image of a paper bill upon receipt of a request from the customer.

* * * * *

UNITED STATES PATENT AND TRADEMARK OFFICE
CERTIFICATE OF CORRECTION

| | | |
|---|---|---|
| PATENT NO. | : 8,165,958 B1 | Page 1 of 1 |
| APPLICATION NO. | : 09/277189 | |
| DATED | : April 24, 2012 | |
| INVENTOR(S) | : Edward G. McLaughlin et al. | |

It is certified that error appears in the above-identified patent and that said Letters Patent is hereby corrected as shown below:

Claim 5, col. 10, lines 48-49, "comprises of submitting" should read
-- comprises submitting --.

Claim 21, col. 12, line 53, "a automated" should read -- an automated --.

Signed and Sealed this
Nineteenth Day of June, 2012

David J. Kappos
*Director of the United States Patent and Trademark Office*